United States Patent
Roddy et al.

(10) Patent No.: US 11,513,811 B2
(45) Date of Patent: Nov. 29, 2022

(54) DEVICE IDENTIFIER TRANSLATION SYSTEMS AND METHODS

(71) Applicant: Citrix Systems, Inc., Ft. Lauderdale, FL (US)

(72) Inventors: Mark Roddy, Hollis, NH (US); Moso Lee, Nashua, NH (US); Simon Piers Graham, Bolton, MA (US)

(73) Assignee: Citrix Systems, Inc., Ft. Lauderdale, FL (US)

( * ) Notice: Subject to any disclaimer, the term of this patent is extended or adjusted under 35 U.S.C. 154(b) by 121 days.

(21) Appl. No.: 17/115,176

(22) Filed: Dec. 8, 2020

(65) Prior Publication Data

US 2022/0179662 A1    Jun. 9, 2022

(51) Int. Cl.
*G06F 9/4401* (2018.01)
*G06F 9/455* (2018.01)

(52) U.S. Cl.
CPC .......... *G06F 9/4413* (2013.01); *G06F 9/4406* (2013.01); *G06F 9/4416* (2013.01); *G06F 9/45558* (2013.01); *G06F 2009/4557* (2013.01); *G06F 2009/45575* (2013.01)

(58) Field of Classification Search
CPC .... G06F 9/4413; G06F 9/4406; G06F 9/4416; G06F 9/45558; G06F 2009/4557; G06F 2009/45575
See application file for complete search history.

(56) References Cited

U.S. PATENT DOCUMENTS

| 8,769,672 | B2 * | 7/2014 | Park | G06F 21/572 726/22 |
| 9,934,166 | B2 * | 4/2018 | Wilkerson | G06F 9/30043 |
| 2011/0153872 | A1 * | 6/2011 | Nath | G06F 1/3206 710/10 |

FOREIGN PATENT DOCUMENTS

| CN | 102819712 A | * | 12/2012 | |
| CN | 106685829 B | * | 6/2020 | H04L 45/74 |

OTHER PUBLICATIONS

International Search Report and Written Opinion dated Feb. 14, 2022 for International Application No. PCT/US2021/058069 (15 pages).

* cited by examiner

Primary Examiner — Henry Tsai
Assistant Examiner — John B Roche
(74) Attorney, Agent, or Firm — Finch & Maloney PLLC

(57) ABSTRACT

A computer system is provided. The computer system includes a memory and at least one processor coupled to the memory. The processor is configured to identify a message to a plug and play (PnP) manager of an operating system, the message comprising an identifier of a device to be configured by the PnP manager, determine whether the device is targeted for device identifier translation at least in part by determining whether the device satisfies one or more target device criteria, and replace the identifier of the device with a reference identifier different from the identifier of the device in response to a determination that the device is targeted for device identifier translation, the reference identifier being usable by the PnP manager to install or configure the device.

18 Claims, 10 Drawing Sheets

DEVICE IDENTIFIER TRANSLATION SYSTEMS AND METHODS

BACKGROUND

Some operating systems, such as MICROSOFT WINDOWS and LINUX, offer plug and play support of a wide variety of computer peripherals. These computer peripherals can include, for example, keyboards, mice, and video cards. Plug and play functionality enables a user to add new peripherals to a computer system easily, i.e., by following a computer-driven process that involves physically connecting the peripheral and, in some instances, answering a few questions regarding the peripheral.

SUMMARY

In at least one example, a computer system is provided. The computer system includes a memory and at least one processor coupled to the memory. The at least one processor is configured to identify a message to a plug and play (PnP) manager of an operating system, the message comprising an identifier of a device to be configured by the PnP manager, determine whether the device is targeted for device identifier translation at least in part by determining whether the device satisfies one or more target device criteria, and replace the identifier of the device with a reference identifier different from the identifier of the device in response to a determination that the device is targeted for device identifier translation, the reference identifier being usable by the PnP manager to install or configure the device.

Examples of the computer system can include one or more of the following features. In the computer system, to replace the identifier of the device can include to replace the identifier of the device during a boot process executable by the operating system. To replace the identifier of the device during the boot process can include replacement of the identifier of the device during an initial boot process after connection of the device. To replace the identifier of the device during the boot process can include replacement of the identifier of the device during kernel mode processing.

In the computer system, the operating system can be a guest operating system executed by a virtual machine. The virtual machine can be one of a plurality of clones of a master virtual machine. In the computer system, the reference identifier can identify reference configuration data to enable the PnP manager to complete installation of the device during kernel mode processing. The reference configuration data can be based on device configuration data generated by installation of a reference device different from the device. The at least one processor can be further configured to establish the reference identifier and the reference configuration data at least in part by accessing the device configuration data. The target device criteria can specify a device to be accessed during a boot process executable by the operating system. The target device criteria can specify a network interface device type.

In at least one example, a method is provided. The method includes detecting a message to a plug and play (PnP) manager of a computer system, the message comprising an identifier of a device to be configured by the PnP manager; determining that the device is targeted for device identifier translation at least in part by determining that the device satisfies one or more target device criteria; and translating the identifier of the device to a reference identifier different from the identifier of the device in response to a determination that the device is targeted for device identifier translation, the reference identifier being usable by the PnP manager to install or configure the device.

Examples of the method can include one or more of the following features. In the method, translating the identifier of the device can include replacing the identifier of the device during kernel mode processing of an initial boot process executed by the computer system after connection of the device. The method can further include streaming a clone of a master virtual machine, the clone comprising a guest operating system comprising the PnP manager. The method can further include establishing the reference identifier from device configuration information generated by installation of a reference device different from the device. In the method, determining that the device satisfies one or more target device criteria can include determining that the device is to be accessed during a boot process executable by the operating system.

In at least one example, a non-transitory computer readable medium is provided. The computer readable medium stores executable sequences of instructions to translate device identifiers. The sequences of instructions include instructions to detect a message to a plug and play (PnP) manager of a computer system, the message comprising an identifier of a device to be configured by the PnP manager; determine whether the device is targeted for device identifier translation at least in part by determining whether the device satisfies one or more target device criteria; and replace, during kernel mode processing of an initial boot process executable by the computer system after connection of the device, the identifier of the device with a reference identifier different from the identifier of the device in response to a determination that the device is targeted for device identifier translation, the reference identifier being usable by the PnP manager to install or configure the device.

Examples of the computer readable medium can include one or more of the following features. The sequences of instructions can further include instructions to stream a clone of a master virtual machine, the clone including a guest operating system comprising the PnP manager. The sequences of instructions can further include instructions to establish the reference identifier from device configuration information generated by installation of a reference device different from the device. The instructions to determine whether the device is targeted for device identifier translation can include instructions to determine whether the device is to be accessed during the initial boot process.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

Figure 1:
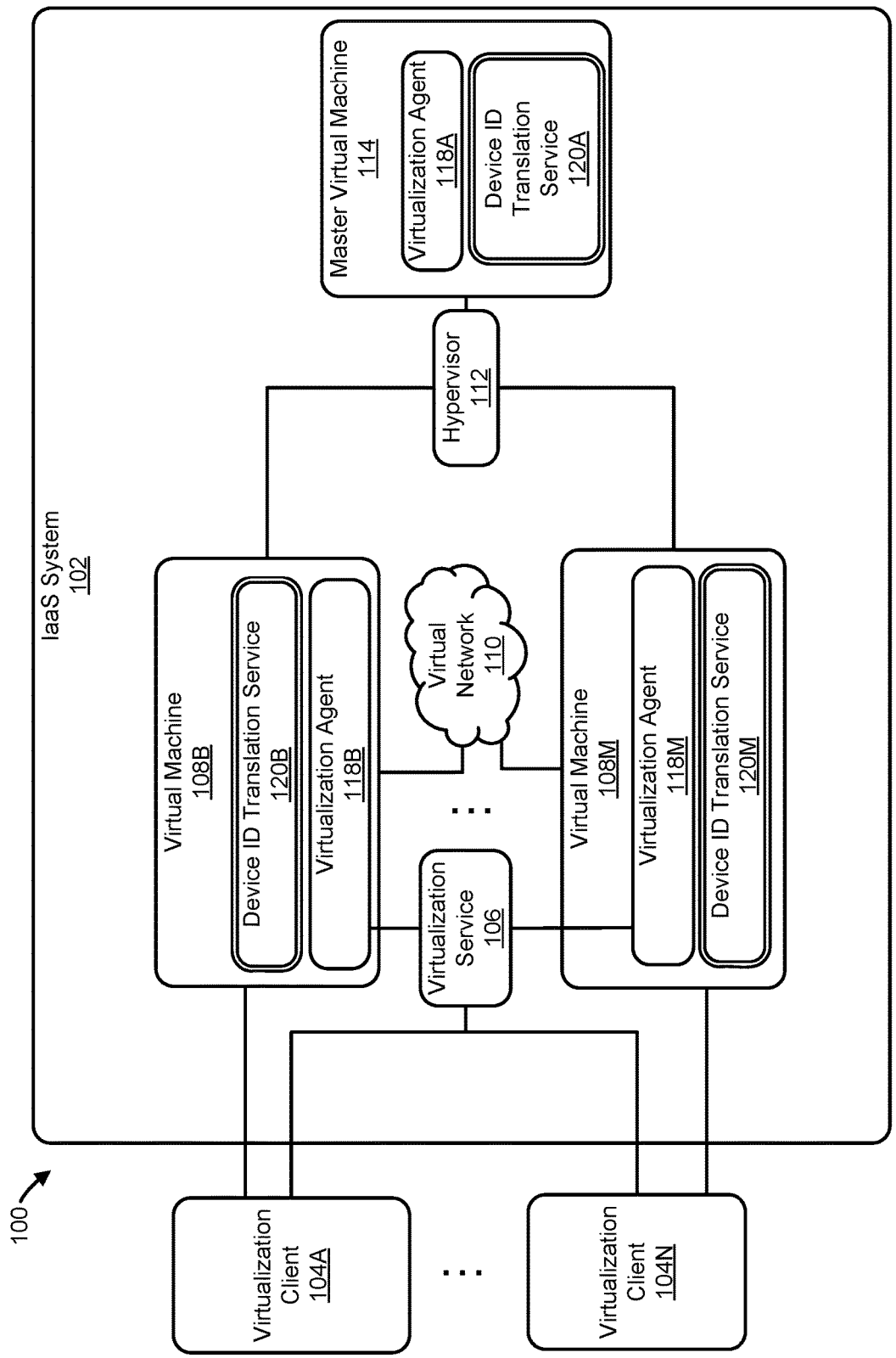
FIG. 1 is a block diagram depicting a system with device identifier translation in accordance with one or more examples described herein.

As summarized above, at least some examples described herein are directed to computer systems and processes that autonomously translate identifiers of certain newly connected devices to reference identifiers used by a plug and play (PnP) manager to fully install the newly connected devices. These systems and processes introduce a level of indirection between the PnP manager and its managed devices that enables nuanced control of particular devices to advantageous effect. In one example, this level of indirection translates an identifier of a device, which is reported by the device, to a reference identifier. This reference identifier can point to device configuration data that was generated by the PnP manager during installation of a previously connected reference device. The PnP manager can use this device configuration data to fully install the device during kernel mode processing, thereby enabling other kernel mode processes to make use of the device. Thus, utilizing the device identifier translation techniques described herein, a computer system can ensure that devices of particular importance are fully installed and available to kernel mode processes during system boot.

These systems and processes overcome technical problems that can arise in computer systems where certain devices are newly connected the computer system but not yet fully installed, operational, and available to processes executed by computer system. Where, for example, these devices provide access to data useful or needed for successful completion of a process, the unavailability of the devices can prevent successful completion of the process. Consider, for instance, an example in which the device is a data storage device that houses data needed to complete a boot process or where the device is a network interface device that communicates with a data store that houses data needed to complete the boot process. In this example, device unavailability can result in a failure of the computer system to boot. While this problem can manifest in any computer system, it can be highly relevant to virtual computer systems, which rely on easy, rapid, and flexible system configurability and deployment as a core aspect of their value proposition.

For instance, in a MICROSOFT AZURE virtual environment, the HYPER-V hypervisor may require that each virtual machine have a network interface card (NIC) with a unique identifier. Although this requirement for unique NIC identifiers can be easily met via the MICROSOFT WINDOWS plug and play (PnP) manager, the requirement can impose a need for the PnP manager to execute in user mode (e.g., to collect information from a user) to fully install the NIC. This imposition, in turn, can beget an additional requirement that each virtual machine be booted into user mode prior to the NIC being available. As explained above, this additional requirement can be particularly troublesome (or even fatal) to initial boot of the virtual machine where kernel mode processes other than the PnP manager need to access the NIC. Moreover, the additional requirement inhibits efficient cloning of master virtual machine images in AZURE, as a new NIC must be installed (via user mode PnP manager processing) in each clone prior to the NIC being available to other processes executed by the clone. The problems resulting from the additional requirement are further compounded where the clones are not persistent and any changes made by the user mode PnP manager processing are reset with each boot.

To overcome these problems, among others, the device identifier translation systems and methods described herein establish a reference identifier for different types of devices targeted for device identifier translation. The device identifier translation systems and methods also substitute identifiers reported to a PnP manager by target devices of the type with the reference identifier for the type. In certain examples, the PnP manager is part of an operating system of the computer system and includes plug and play automation. In these examples, the reference identifier points to device configuration data suitable to complete installation, by kernel mode plug and play processing, of the type of device with which the reference identifier is associated. In some examples, this reference configuration data is generated by full installation, by the plug and play automation, of a reference device that is of the same type as the target device. As such, by substituting a target device identifier with a reference identifier, the device identifier translation systems and methods described herein cause the plug and play automation to fully install and make available newly connected devices of the targeted type during kernel mode processing.

In some examples, to establish a reference identifier, the device identifier translation systems and methods described herein locate device configuration data for the reference device using a predefined identifier of the reference device. This predefined identifier can be hardcoded or supplied by a user at runtime. Once the device configuration data for the reference device is located, the device identifier translation systems and methods make the device configuration data accessible to plug and play automation via the reference identifier, thereby establishing the device configuration data as reference configuration data. For instance, the device identifier translation systems and methods can create a copy of the device configuration data at a location accessible by the plug and play automation through the reference identifier and/or can replace the predefined identifier of the reference device with the reference identifier.

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

System with Device Identifier Translation

In some examples, an Infrastructure as a Service (IaaS) system is configured to autonomously translate device identifiers within a plurality of virtual machines streamed from a single, static master image. FIG. 1 illustrates a system 100 of computer-implemented processes that execute device identifier translation in accordance with these examples.

As shown in FIG. 1, the system 100 includes an IaaS system 102 and a plurality of virtualization clients 104A-104N. The IaaS system 102 stores and implements a virtualization service 106, a plurality of virtual machines 108B-108M, a virtual network 110, a hypervisor 112, and a master virtual machine 114. Further, as shown in FIG. 1, the master virtual machine 114 includes a virtualization agent 118A and a device identifier translation service 120A. The virtual machines 108B-108M, which are cloned instances of the master virtual machine 114, host a plurality of virtualization agents 118B-118M and a plurality of device identifier translation services 120B-120M. Each of the pluralities of virtualization clients 104A-104N, virtual machines 108B-108M, virtualization agents 118A-118M, and device identifier translation services 120A-120M, may be referred to as the virtualization clients 104, the virtual machines 108, the virtualization agents 118, and the device identifier translation services 120. Individual members of these pluralities may be referred to generically as a virtualization client 104, a virtual machine 108, a virtualization agent 118, or a device identifier translation service 120.

As shown in FIG. 1, the master virtual machine 114 persists or otherwise remains as an image file that the hypervisor 112 (e.g., a CITRIX HYPERVISOR or a MICROSOFT HYPER-V hypervisor) is configured to stream as the virtual machines 108. As such, the configuration of the master virtual machine 114 (e.g., its machine performance profile, operating system, application suite, etc.) varies between examples, depending on the purpose of the virtual machines 108. For instance, where the virtual machines 108 are configured as general-purpose virtual desktops, the processing speed and available memory of the master virtual machine 114 may be equivalent to a workstation and the operating system may be MICROSOFT WINDOWS. In another example, where the virtual machines 108 are configured as application servers, the processing speed and available memory of the master virtual machine 114 may be equivalent to a server computer and the operating system may be LINUX. Other virtual machine configurations can be utilized with the examples described herein. The virtual machines described herein are logical constructs that include virtualized versions of the physical parts of a computing system. As such, the virtual machines include a virtual processor and virtual memory coupled to one another via a virtual interconnect (e.g., a virtual bus). Other physical parts of a computing system may be included within the virtual machines described herein.

With continued reference to FIG. 1, the translation services 120 are configured to implement device identifier translation within its host virtual machine. To do so, in some examples, the translation services 120 are configured to monitor device identifiers reported from newly connected devices, for example, during the boot process of its host virtual machine. These newly connected devices may include devices physically connected to the host machine that have not yet been fully installed by plug and play automation implemented by the host machine. The reported device identifiers may identify the newly connected devices to the plug and play automation.

In some examples, the translation services 120 are further configured to identify a subset of the newly connected devices that are targeted for device identifier translation. For instance, in certain examples, the translation services 120 are configured to determine whether any newly connected devices meets one or more target device criteria common to devices targeted for device identifier translation. These target device criteria can specify, for example, a type of physical connection (e.g., a type of bus) through which a device can communicate, a model of the device, a serial number of the device, a functional type of the device, whether other instances of the device type are already installed, and/or any other identifier of the device through which an appropriate driver for the device can be identified and configured by the plug and play automation. Further, in these examples, the translation services 120 are configured to record any newly connected device meeting the target device criteria as being a target device.

In some examples, the translation services 120 are configured to translate device identifiers reported by the target devices to one or more reference identifiers of device configuration data. This device configuration data may have been generated by previous installation of devices by the plug and play automation and may be referred to herein as reference configuration data. Further, in these examples, the devices previously installed by the plug and play automation utilize the same operating system infrastructure (e.g., device drivers, installation information, etc.) as the target devices. As such, the reference configuration data accessible via the reference identifiers can be used by the plug and play automation to complete installation of the target devices.

For instance, in some examples, the translation services 120 are configured to replace identifiers of the target devices included within messages to the plug and play automation with the reference identifiers. In these examples, the reference identifiers included in the message identify, to the plug and play automation, reference configuration data that indicates the target devices have already been completely installed. By replacing the identifiers of the target devices with the reference identifiers, the translation services 120 cause subsequent execution of the plug and play automation to configure the target devices to use the operating system infrastructure as specified by the reference configuration data. As such, the plug and play automation fully installs the target devices immediately (i.e., during kernel mode processing) and autonomously (i.e., without requesting additional information from a user).

In some examples, at least one translation service 120 (e.g., the translation service 120A) is also configured to establish the reference identifiers by locating reference configuration data suitable for individual reference identifiers and making the reference configuration data accessible via the individual reference identifiers. For instance, in certain examples, the translation service 120 is configured to identify, as reference configuration data, device configuration data generated by plug and play installation of one or more preselected (e.g., hardcoded) installed devices. Alternatively or additionally, in some examples, the translation service 120 is configured to identify, as reference configuration data, device configuration data generated by plug and play installation of one or more installed devices selected by a user via user interface rendered by the translation service 120. Regardless, in these examples, the translation service 120 is also configured to create copies of the identified device configuration data at locations accessible via the reference identifiers and/or to change identifiers of the identified device configuration data to the reference identifiers, thereby completing establishment of the reference identifiers.

In some examples, the translation service 120 is also configured to establish the target device criteria used to identify devices for device identifier translation. For instance, in some examples, the translation service 120 can determine target device criteria for the installed devices with device configuration data that was identified as reference configuration data. Further, in these examples, the translation service 120 can store data specifying the target device criteria at a reserved location accessible during monitoring of newly connected devices.

Further, in these examples, the translation service 120 can store the established reference identifiers and/or the target device criteria locally. This feature is particularly useful when executed by the translation service 120A on the master virtual machine 114 because once the reference identifiers and the target device criteria are established and locally stored in the master virtual machine 114 image file, they can be streamed by the hypervisor 112 as part of the virtual machines 108. As such, the reference identifiers and the target device criteria can be locally accessed and utilized by the translation services 120B-120M during the initial boot of the virtual machines 108.

The device identifier translation implemented by the translation services 120 described herein enables the virtual machines 108 to access the target devices during kernel mode processing of their initial boot processes. This access can be particularly advantageous where, for instance, the boot processes utilize data accessible via the target devices. Additional details regarding processes that certain implementations of the translation services 120 are configured to execute are described below with reference to FIGS. 2-6B.

In some examples, the virtual machines 108 are configured to connect to, and communicate with one another via, the virtual network 110. The virtual network 110 can include a variety of virtual constructs (e.g., routers, switches, firewalls, etc.) in particular examples. In addition, the virtual network 110 can be, for example, associated with a particular tenant of the IaaS system 102. As such, the virtual network 110 can be implemented using an address space, one or more subnets, and routing tables associated with the tenant. It should be noted that, within examples incorporating MICROSOFT AZURE IaaS as the IaaS 102, the virtual network 110 can be implemented as a VNet.

As shown in FIG. 1, the virtualization agents 118, the virtualization service 106, and the virtualization clients 104 are configured to interoperate to establish a virtualization infrastructure. This virtualization infrastructure enables a virtual resource (e.g., a virtual machine 108) executing within a first physical computing environment to be securely accessed by an application (e.g., a virtualization client 104) executing within a second physical computing environment remote from the first physical computing environment. This access can allow a user of the application to interact with the virtual resource as if the virtual resource was the second physical computing environment.

More specifically, within at least one example virtualization infrastructure, the virtualization service 106 is configured to interoperate with the virtualization agents 118 to determine the types of virtual computing sessions (e.g., virtual desktops, virtual applications, etc.) supported by the virtualization agents 118. The virtualization service 106 is also configured to publish the supported types of virtual computing sessions to the virtualization clients 104, and to broker creation of virtual computing sessions of the supported types between the virtual resources made available by the virtualization agents 118 and the virtualization clients 104. Further, within this example virtualization infrastructure, the virtualization agents 118 are configured to make a computing environment in which it operates (e.g., a virtual machine 108) available to execute virtual computing sessions of the supported types and to notify the virtualization service 106 of the availability of the virtual computing sessions. In a complementary fashion, the virtualization clients 104 is configured to interoperate with the virtualization service 106 to invoke and connect to the virtual computing sessions managed by virtualization agents 118. Within the context of a CITRIX HDX virtualization infrastructure, the virtualization agents 118 can be implemented as, for example, virtual delivery agents installed on the virtual machines 108 and the virtualization clients 104 can be implemented as, for example, CITRIX WORKSPACE clients, CITRIX RECEIVER clients, and/or hypertext markup language (HTML) 5 compliant browsers. Further, the virtualization service 106 can be implemented as a CITRIX WORKSPACE service and/or a CITRIX STOREFRONT service.

The computer-implemented processes illustrated in FIG. 1 can communicate with one another using a variety of techniques. These techniques can include inter-process communication (e.g., where two or more of the computer-implemented processes illustrated in FIG. 1 reside within the same execution environment) and network-based communication (e.g., where two or more of the computer-implemented processes reside in different execution environments coupled to one another by a computer network). In some examples, communications can include hypertext transfer protocol (HTTP) based communications. It should be noted that the computer-implemented process illustrated in FIG. 1 can be implemented in hardware or a combination of hardware and software.

Figure 2:
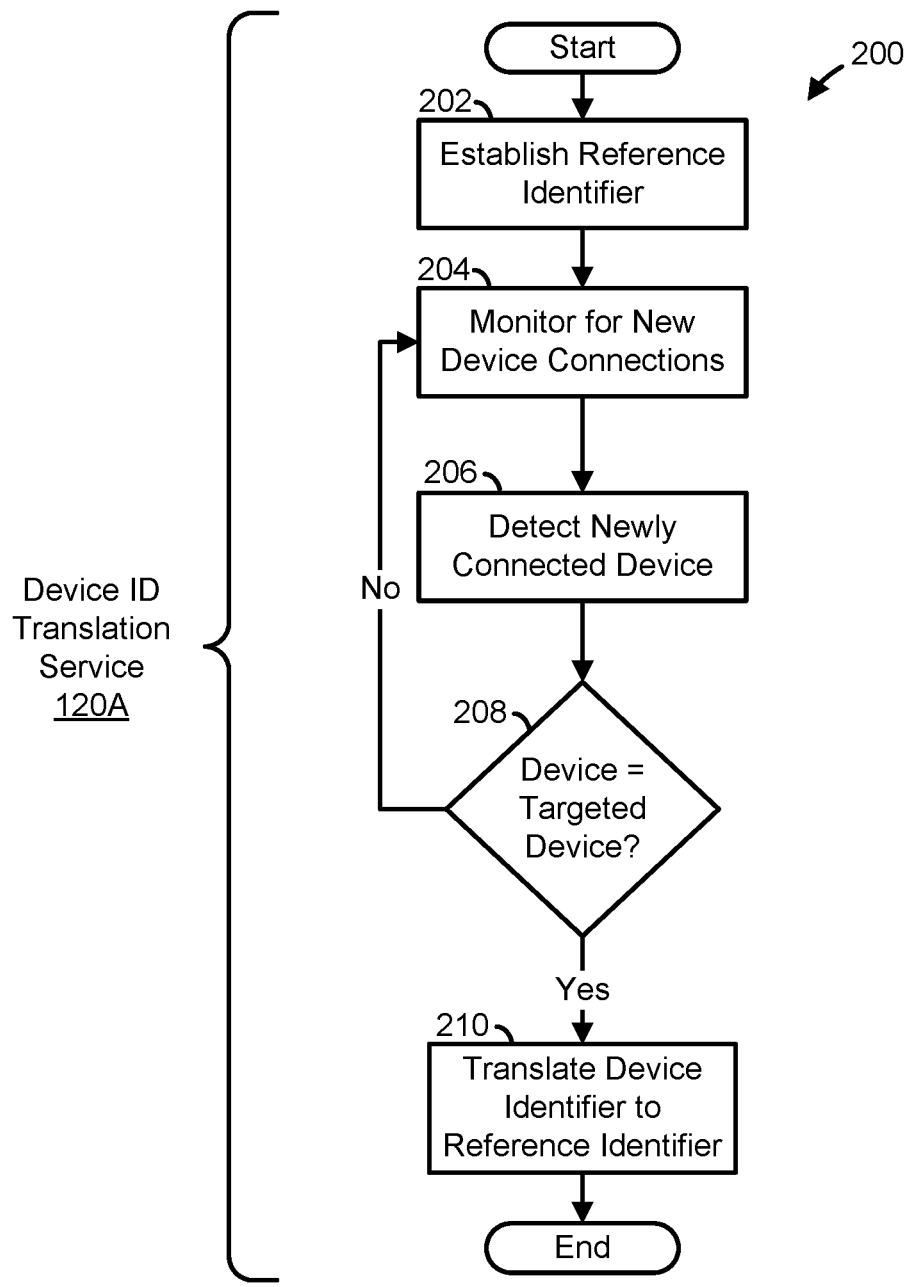
FIG. 2. is a flow diagram showing a device identifier translation process in accordance with one or more examples described herein.

FIG. 2 illustrates a device identifier translation process 200 executed by a translation service (e.g., the translation service 120 of FIG. 1) in some examples. As shown in FIG. 2, the process 200 starts with the translation service establishing 202 a reference identifier associated with target device criteria. For instance, in some examples, the translation service can locate (e.g. within a registry of its host virtual machine) device configuration data of a reference device of the same type as the target device and create a copy of the device configuration data that is accessible via the reference identifier. In this way, the translation service establishes the reference identifier and the reference configuration data to which the reference identifier points.

Continuing with the process 200, the translation service monitors 204 for devices newly connected to the virtual machine. For instance, in some examples, the translation service subscribes to receive messages announcing connections of new devices. In these examples, the translation service requests subscription by interoperating with other processes hosted by the virtual machine that are involved in installation of new devices, such as a device enumerator, plug and play automation, or some other operating system process. This interaction may be accomplished via an application programming interface (API) exposed by the other processes.

Continuing with the process 200, the translation service detects 206 a newly connected device. For instance, in some examples, the translation service receives a message from a bus driver indicating that a new device has been connected to the bus. Next, the translation service determines 208 whether the newly connected device is targeted for device identifier translation. For instance, in some examples, the translation service compares the newly connected device to target device criteria associated with the reference identifier and determines 208 that the newly connected device is targeted for device identifier translation where the newly connected device satisfies the target device criteria. More specifically, in at least one example, the translation service compares the identifier of the newly connected device to a predefined identifier specified in the target device criteria. In this example, the translation service determines 208 that the newly connected device is targeted for device identifier translation where the identifier of the newly connected device matches (e.g., is the same as or has some other predefined relationship with) the predefined identifier. In this example, the target device criteria described above specifies that an identifier of the newly connected device must match the predefined identifier.

Continuing with the process 200, the translation service translates 210 (e.g., replaces or modifies) the identifier of the newly connected device to the reference identifier prior to processing by plug and play automation of the newly installed device. In this way, the translation service causes the plug and play service to configure the newly installed device according to the reference configuration data pointed to by the reference identifier.

Figure 3A:
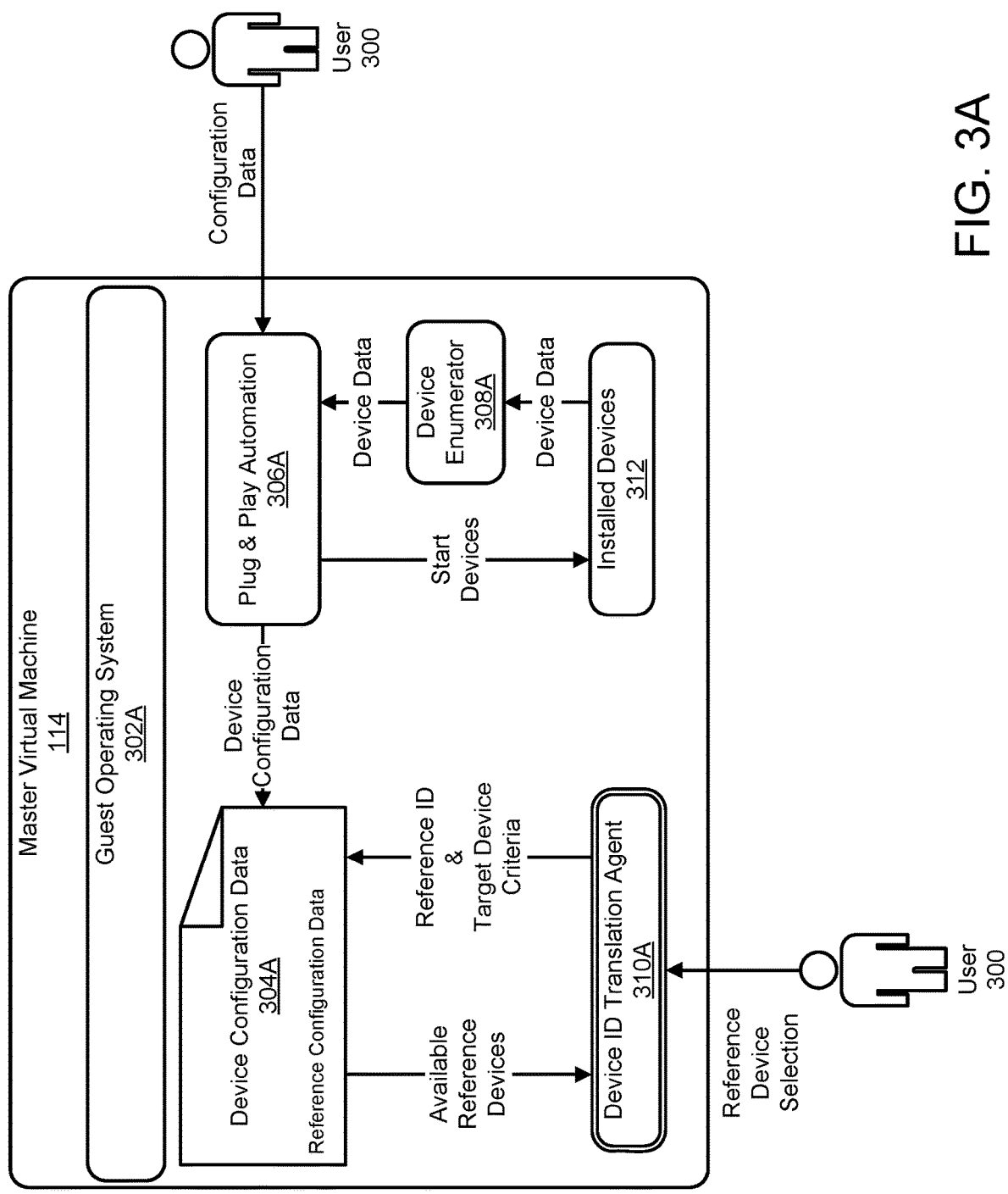
FIGS. 3A and 3B are block diagrams illustrating selected parts of the system of FIG. 1 in accordance with one or more examples described herein.
Figure 3B:
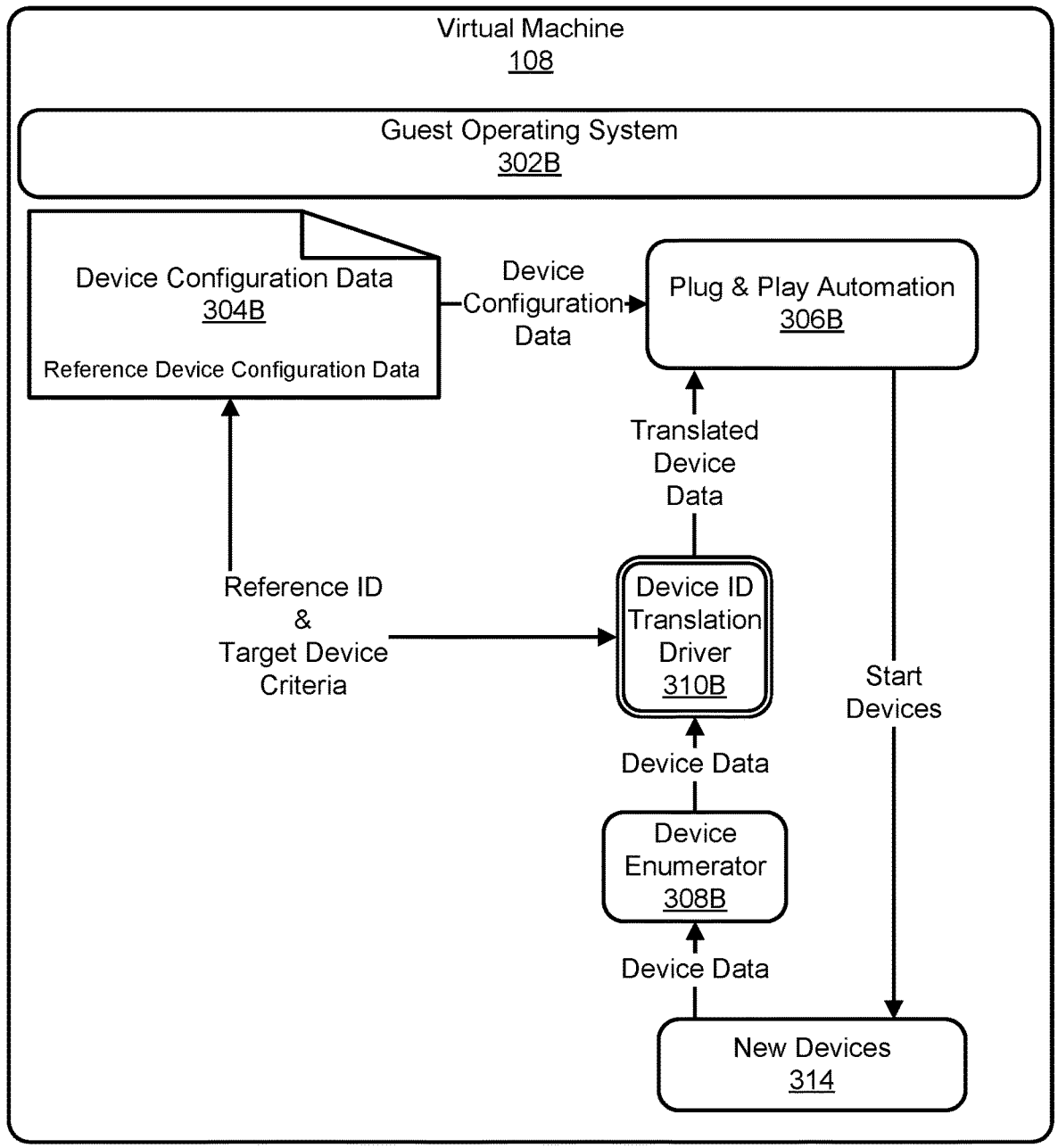

FIGS. 3A and 3B illustrate, in greater detail, selected parts of one example of the system 100. For instance, within FIGS. 3A and 3B, the translation service 120 takes the form of a translation agent 310A and a translation driver 310B. In some examples, the translation agent 310A is a user mode application configured to establish reference identifiers. These reference identifiers can be used by the translation driver 310B to translate an identifier of a target device satisfying target device criteria associated with the reference identifier. Further, in these examples, the translation driver 310B is a kernel mode application configured to monitor for device identifiers reported from newly connected devices during the boot process of its host machine. The translation driver 310B is configured to translate identifiers of newly connected devices meeting target device criteria to a reference identifier associated with the target device criteria. Additional description of this particular implementation of the translation service 120 follows.

FIG. 3A illustrates one example of the master virtual machine 114 of FIG. 1. As shown in FIG. 3A, the master virtual machine 114 implements a guest operating system 302A that supports execution of plug and play automation 306A, a device enumerator 308A, and a device identifier translation agent 310A. The master virtual machine 114 of FIG. 3A stores (e.g., within a virtual memory) device configuration data 304A and is connected to one or more installed devices 312. In this example, the device configuration data 304A is indexed by identifiers of the installed devices 312 and includes device configuration data generated by previous execution of plug and play automation. In some examples, the device configuration data 304A is stored in a registry of the guest operating system 302A.

In some examples illustrated by FIG. 3A, the guest operating system 302A is MICROSOFT WINDOWS or LINUX. In these examples, the plug and play automation 306A and the device enumerator 308A are a part of, and supplied with, the guest operating system 302A. Further, in these examples, the guest operating system 302A is configured to discover newly connected devices as part of kernel mode processing executed during boot of the master virtual machine 114. More specifically, in certain examples, the plug and play automation 306A can be configured to interoperate with the device enumerator 308A to identify and install newly connected devices. In these examples, the plug and play automation 306A is configured to interact with a user 300, if necessary, to acquire configuration data needed to complete installation of the newly connected devices. Further, in these examples, the plug and play automation 306A is configured to store device configuration data for newly connected devices within the device configuration data 304A upon completion of their installation. This device configuration data can be used by the plug and play automation 306A to identify and start the installed devices 312 during kernel mode processing of subsequent boots of the master virtual machine 114 or clones thereof.

As shown in FIG. 3A, the translation agent 310A is a user mode application configured to establish one or more reference identifiers within the device configuration data 304A. In certain examples, these reference identifiers include at least one reference identifier of reference configuration data generated by installation of a preselected device (e.g., a network interface card, a storage device, etc.). In these examples, the translation agent 310A is configured to establish the reference identifier by storing, at a location accessible via the reference identifier, a copy of device configuration data accessible via an identifier the preselected device. The identifier of the preselected device may be, for example, a hardcoded value. Alternatively or additionally, to establish the reference identifier, the translation agent 310A can replace the identifier of the preselected device within the device configuration data 304A with the reference identifier. It should be noted that in these examples, no user interaction with the translation agent 310A may be required. As such, in these examples, the translation agent 310A can be automatically executed via scripting automation (without user interaction) or can be executed at the request of the user 300.

Alternatively or additionally, in some examples, the reference identifiers include at least one reference identifier of reference configuration data selected by the user 300. In these examples, the translation agent 310A is configured to establish the reference identifier by storing, at a location accessible via the reference identifier, a copy of device configuration data accessible via an identifier of an installed device selected by the user 300. For instance, in these examples, the translation agent 310A is configured to enable the user 300 to select the installed device by retrieving, from the device configuration data 304A, identifiers of the installed devices 312 and prompting the user 300, via a user interface, to select one of the installed devices 312. In these examples, the translation agent 310A can receive input from the user 300 specifying a selection of an installed device and handle this input by storing, at the location accessible via the reference identifier, a copy of device configuration data accessible via an identifier of the selected, installed device.

Further, in some examples, the translation agent 310A is configured to determine target device criteria for the selected (or preselected) installed devices 312 and to establish a distinct reference identifier associated with instances of target device criteria for subsequent use in device identifier translation. For instance, in certain examples, the translation agent 310A is configured to handle the input specifying the selection of the installed device by recording (as part of target device criteria) a functional type of the selected, installed device; a model of the selected, installed device; a serial number of the selected, installed device; and/or any other identifier of the selected, installed device through which an appropriate driver for the device can be identified and configured by the plug and play automation. In these examples, the translation agent 310A is further configured to store (e.g., in the device configuration data 304A) the recorded target device criteria and an association between the target device criteria and the reference identifier. This association can be subsequently used to translate an identifier of a newly connected device meeting the target device criteria to the reference identifier. It should be noted that, in some examples, the translation agent 310A is configured to prompt the user to directly select the target device criteria to associate with a reference identifier instead of, or in addition to, indirectly selecting the target device criteria by selecting a previously installed device satisfying the target device criteria, as described above. Additional details regarding processes that certain implementations of the translation agent 310A is configured to execute are described below with reference to FIG. 4.

FIG. 3B illustrates one example of a virtual machine 108 of FIG. 1 in greater detail. As shown in FIG. 3B, the virtual machine 108 implements a guest operating system 302B that supports execution of plug and play automation 306B, a device enumerator 308B, and a device identifier translation driver 310B. The virtual machine 108 of FIG. 3B stores (e.g., within a virtual memory) device configuration data 304B and is connected to one or more new devices 314. In this example, the device configuration data 304B is indexed by identifiers of installed devices and includes device configuration data generated by previous execution of plug and play automation. In some examples, the device configuration data 304B is stored in a registry of the guest operating system 302B.

In some examples illustrated by FIG. 3B, the guest operating system 302B is MICROSOFT WINDOWS or LINUX. In these examples, the plug and play automation 306B and the device enumerator 308B are a part of, and supplied with, the guest operating system 302B. The device enumerator can one of a variety of enumerators supported by the guest operating system 302B, such as VMBUS, PCI, PnpISA, SCSI, and USB. Further, in these examples, the guest operating system 302B is configured to discover the new devices 314 as part of kernel mode processing executed during boot of the virtual machine 108. More specifically, in certain examples, the plug and play automation 306B can be configured to interoperate with the device enumerator 308B to identify and install the new devices 314. In these examples, the plug and play automation 306B is configured to retrieve, from the device configuration data 304B, device configuration data needed to complete installation of the new devices 314. Further, in these examples, the plug and play automation 306B is configured to start the new devices 314 upon completion of the installation during kernel mode processing.

In certain examples, the translation driver 310B is configured to register with the guest operating system 302B to receive messages generated by the device enumerator 308B that announce the new devices 314. For instance, in some examples, the translation driver 310B can subscribe to device announcement messages via an API exposed by the plug and play automation 306B, the device enumerator 308B, or some other part of the guest operating system 302B. In some examples, after subscription, the translation driver 310B is configured to receive, during kernel mode processing, messages addressed to the plug and play automation 306B prior to the plug and play automation 306B, thereby enabling the translation driver 310B to modify these messages prior to the messages being processed by the plug and play automation 306B.

Further, in these examples, the translation driver 310B is configured to determine whether the new devices 314 identified in received device announcement messages satisfy target device criteria. For instance, in some examples, the translation driver 310B is configured to determine whether the new devices 314 are of a particular functional type (e.g., a network interface card, a storage device, etc.). Data specifying the target device criteria may be hardcoded within the translation driver 310B or stored at an address reserved for data specifying instances of target device criteria (e.g., in the device configuration data 304B) that is accessible by the translation driver 310B. This data specifying instances of target device criteria may have been generated by operation of a translation agent (e.g., the translation agent 310A of FIG. 3A), as described above.

In some examples, the translation driver 310B is further configured to execute device identifier translation where the translation driver 310B determines that the new devices 314 meet target device criteria. For instance, in some examples, the translation driver 310B can replace identifiers of new devices 314 included in announcement messages (and/or other messages addressed to the plug & play automation 306B) with reference identifiers prior to processing of the announcement messages by the plug & play automation 306B. The reference identifiers may be hardcoded within the translation driver 310B or generated by the translation agent and stored in the device configuration data 304B, as described above.

With the translation driver 310B in place, the plug & play automation 306B operates normally to identify, configure, and start the new devices 314 as it does for previously installed devices (i.e., during kernel mode processing and without user interaction). While operating on the new devices 314, the plug & play automation 306B can, for example, access (e.g., via a reference identifier) reference configuration information stored in the device configuration data 304B. By configuring the new devices 314 for operation, the plug & play automation 306B, completes the installation of the new devices 314, making them available for other kernel mode processing during the initial boot of the virtual machine 108. Additional details regarding processes that certain implementations of the translation driver 310B is configured to execute are described below with reference to FIG. 5.

As described above, at least some examples described herein include a system configured to autonomously translate device identifiers (e.g., the system 100 of FIG. 1). Such a system can be configured to execute device identifier translation processes, such as processes 400 and 500 illustrated in FIGS. 4 and 5. In these examples, the process 400 establishes a reference identifier, and the process 500 uses the established reference identifier to translate identifiers of target devices to the reference identifier.

Figure 4:
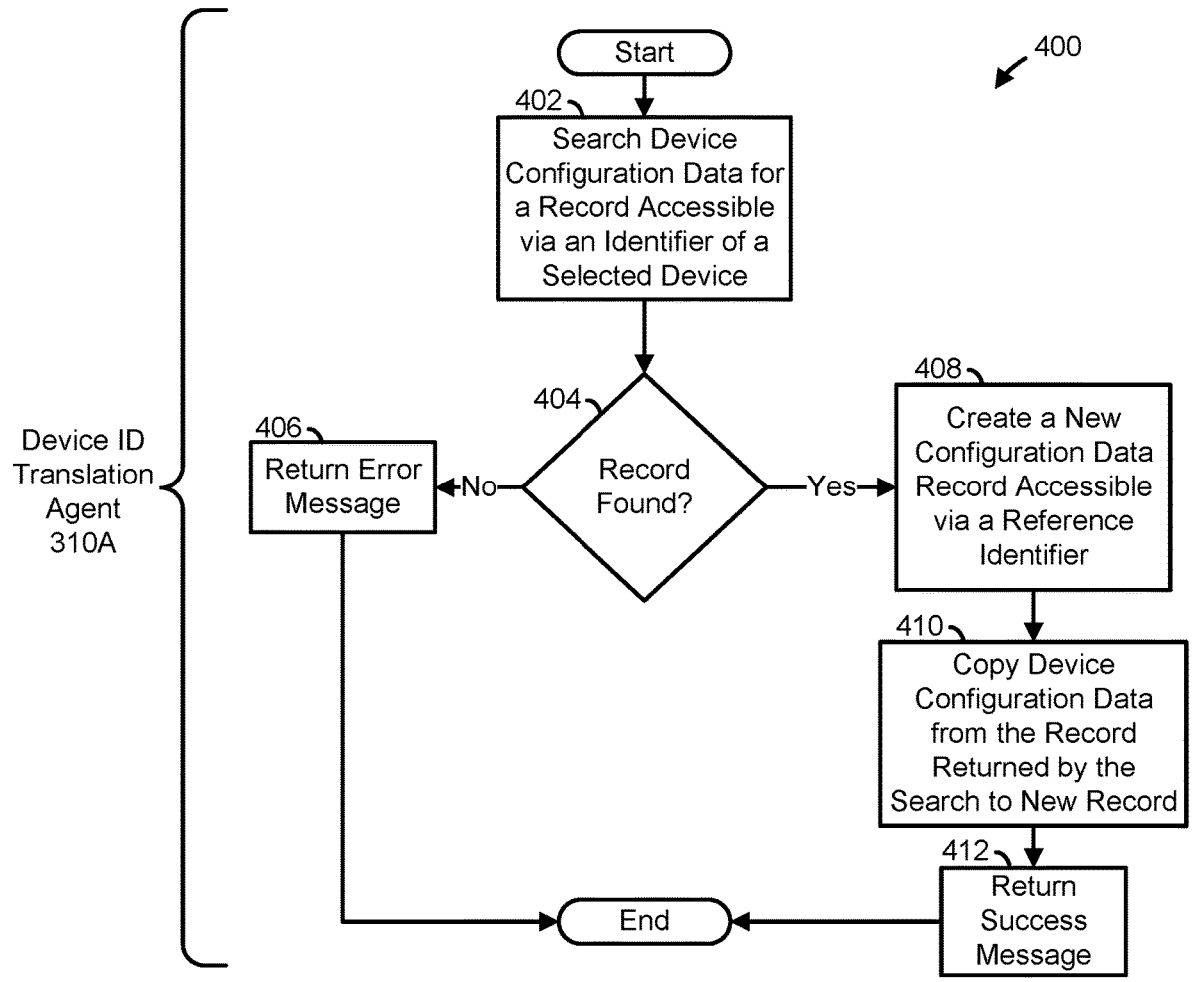
FIG. 4 is a flow diagram showing a reference identifier establishment process in accordance with one or more examples described herein.

As shown in FIG. 4, the process 400 starts with a translation service (e.g., the translation agent 310A of FIG. 3A) hosted by a master virtual machine (e.g., the master virtual machine 114 of FIG. 3A) searching 402 device configuration data (e.g., the device configuration data 304A of FIG. 3A) for records accessible via an identifier of a preselected, or selected, installed device. For instance, in one example where the master virtual machine executes a MICROSOFT WINDOWS guest operating system and the device is a Hyper-V Gen 2 network device, the translation service searches 402 the Windows Registry for an ENUM key (e.g., a key located within the HKEY_LOCAL_MACHINE\SYSTEM\CurrentControlSet\ Enum subtree) specifying a device enumerator of "VMBUS", a device identifier of "{f8615163-df3e-46c5-913f-f2d21965ed0e}", a device instance identifier of "16161b292-1a10-489f-9fed-a4788aa586a41", and a device instance index of 1. The device instance identifier may be referred to as a virtual system identifier (VSID).

Continuing with the process 400, the translation service determines 404 whether the search returned a record including device configuration information for the installed device. Where the translation service determines 404 that the search did not return a record, the translation service returns 406 an error message to its calling process, and the process 400 ends. Where the translation service determines 404 that the search returned a record, the translation service proceeds to operation 408.

Continuing with the process 400, the translation service creates 408 a new record in the device configuration data that is accessible via a reference identifier. For instance, continuing with the previous example, the translation service creates 408 a new ENUM key in the Windows Registry specifying a device enumerator of "VMBUS", a device identifier of "{f8615163-df3e-46c5-913f-f2d21965ed0e}", a device instance identifier equivalent to the reference identifier, and a device instance index of 1.

Continuing with the process 400, the translation service copies 410, to the new record, device configuration data from the record returned by the search, thereby establishing a reference identifier including reference configuration data. For instance, continuing with the previous example, the translation service copies the data stored in the ENUM key found via the search into the newly created ENUM key. Subsequent to copying 410 the device configuration data, the translation service returns 412 a success message to its calling process, and the process 400 ends.

Figure 5:
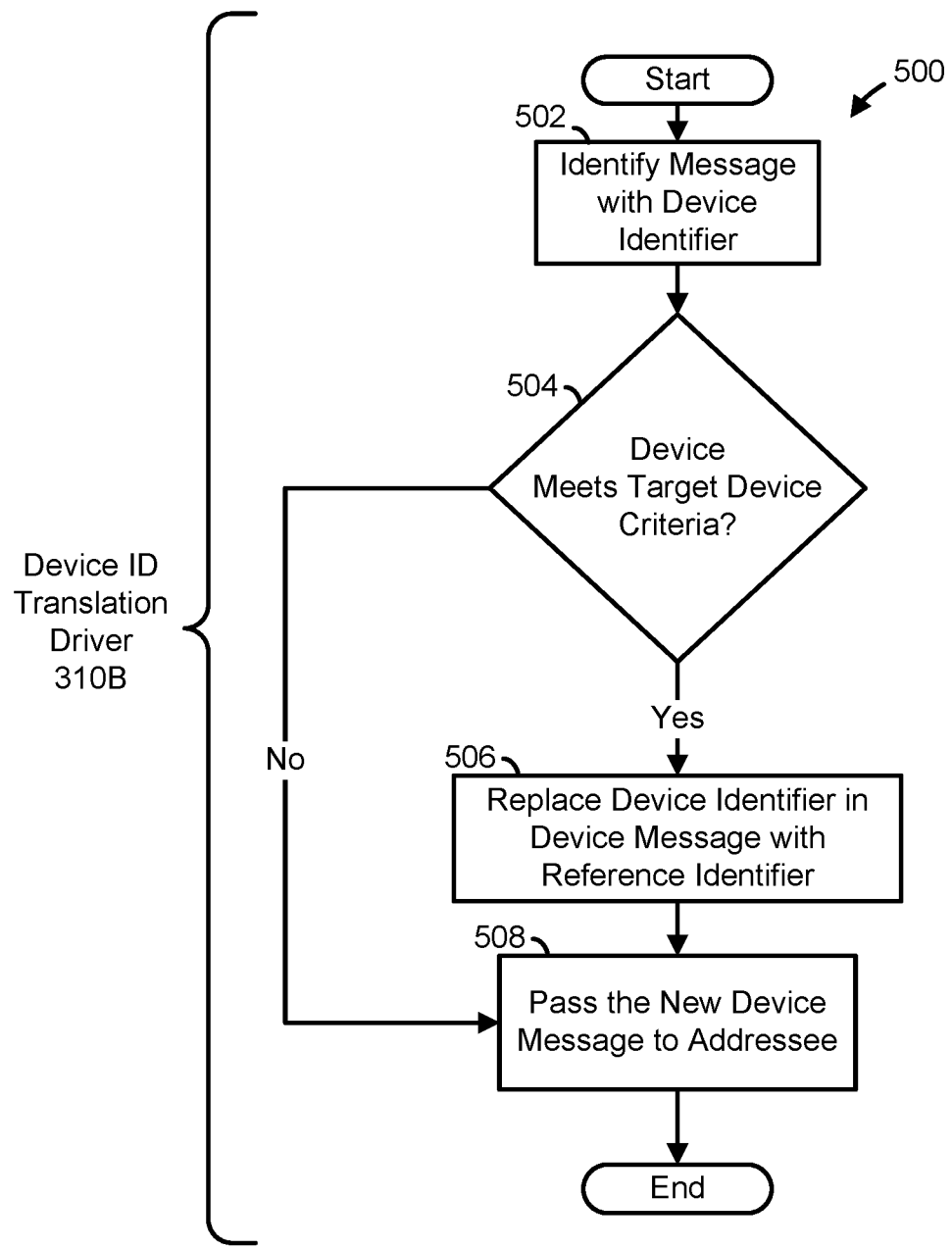
FIG. 5 is a flow diagram showing a device identifier translation process in accordance with one or more examples described herein.

As shown in FIG. 5, the process 500 starts with a translation service (e.g., the translation driver 310B of FIG. 3B) identifying 502 a message specifying one or more identifiers of a device. In some examples, the message specifies one or more identifiers of a newly connected device and is identified 502 during kernel mode processing executed by a virtual machine (e.g., the virtual machine 108 of FIG. 1). In certain examples, this message is addressed to plug and play automation (e.g., the plug and play automation 306B of FIG. 3B). For instance, continuing the example described above with reference to FIG. 4, the translation service identifies a response from a device enumerator (e.g., the device enumerator 308B of FIG. 3B) to a request from the plug and play automation to return identifiers of devices accessible via the device enumerator. This request from the plug and play automation can be, for instance, a IRP_MN_QUERY_ID request. In this example, the message specifies the identifiers of devices accessible via the device enumerator.

Continuing with the process 500, the translation service determines 504 whether any of the devices identified in the message meet target device criteria indicating the device is targeted for device identifier translation. For instance, continuing the previous example, the translation service can determine whether any of the devices is the first Hyper-V synthetic network device type to be configured by the plug and play automation by inspecting the device enumerator, the device identifier, and the device instance index. In this example, the translation service determines that any device accessible via the "VMBUS" enumerator and having a device identifier of "{f8615163-df3e-46c5-913f-f2d21965ed0e}" and a device instance index=1 is targeted for device identifier translation. Where the translation service determines 504 that none of the devices satisfies target device criteria, the translation service proceeds to operation 508. Where the translation service determines 504 that one or more devices satisfy target device criteria, the translation service proceeds to operation 506.

Continuing with the process 500, the translation service replaces 506 the identifier of the target device specified in the message with a reference identifier associated with the target device criteria. For instance, continuing the previous example, the translation service replaces the device instance identifier in the message with the reference identifier, thereby translating the identifier of the target device specified in the message.

Continuing with the process 500, the translation service passes 508 the message on to the addressee of the message (e.g., the plug and play automation), and the process 500 ends.

In at least one example, a system with device identifier translation (e.g., the system 100) comprises an IaaS system (e.g., the IaaS system 102 of FIG. 1) implemented using MICROSOFT AZURE. In this example, the system implements a master virtual machine (e.g., the master virtual machine 114 of FIG. 1) executing a MICROSOFT WINDOWS guest operating system and a hypervisor (e.g., the hypervisor 112 of FIG. 1) that is a MICROSOFT HYPER-V hypervisor. The hypervisor streams a plurality of virtual machines (e.g., the virtual machines 108 of FIG. 1) that are clones of the master virtual machine. The virtual machines include a device enumerator (e.g., the device enumerator 308B of FIG. 3B) that is a VMBUS enumerator that is connected to a new device (e.g., one of the new devices 314 of FIG. 3B) that is a Hyper-V synthetic network device. Further, the virtual machines includes device configuration data (e.g., the device configuration data 304B of FIG. 3B) that stores an ENUM key for an installed device (e.g., one of the installed devices 312 of FIG. 3A) specifying a device enumerator of "VMBUS", a device identifier of "{f8615163-df3e-46c5-913f-f2d21965ed0e}", a device instance identifier of "16161b292-1a10-489f-9fed-a4788aa586a41", and a device instance index of 1. In this example, the device configuration data also stores reference configuration data in an ENUM key for a reference device specifying a device enumerator of "VMBUS", a device identifier of "{f8615163-df3e-46c5-913f-f2d21965ed0e}", a reference identifier (e.g., a globally unique identifier (GUID)), and a device instance index of 1.

Figure 6A:
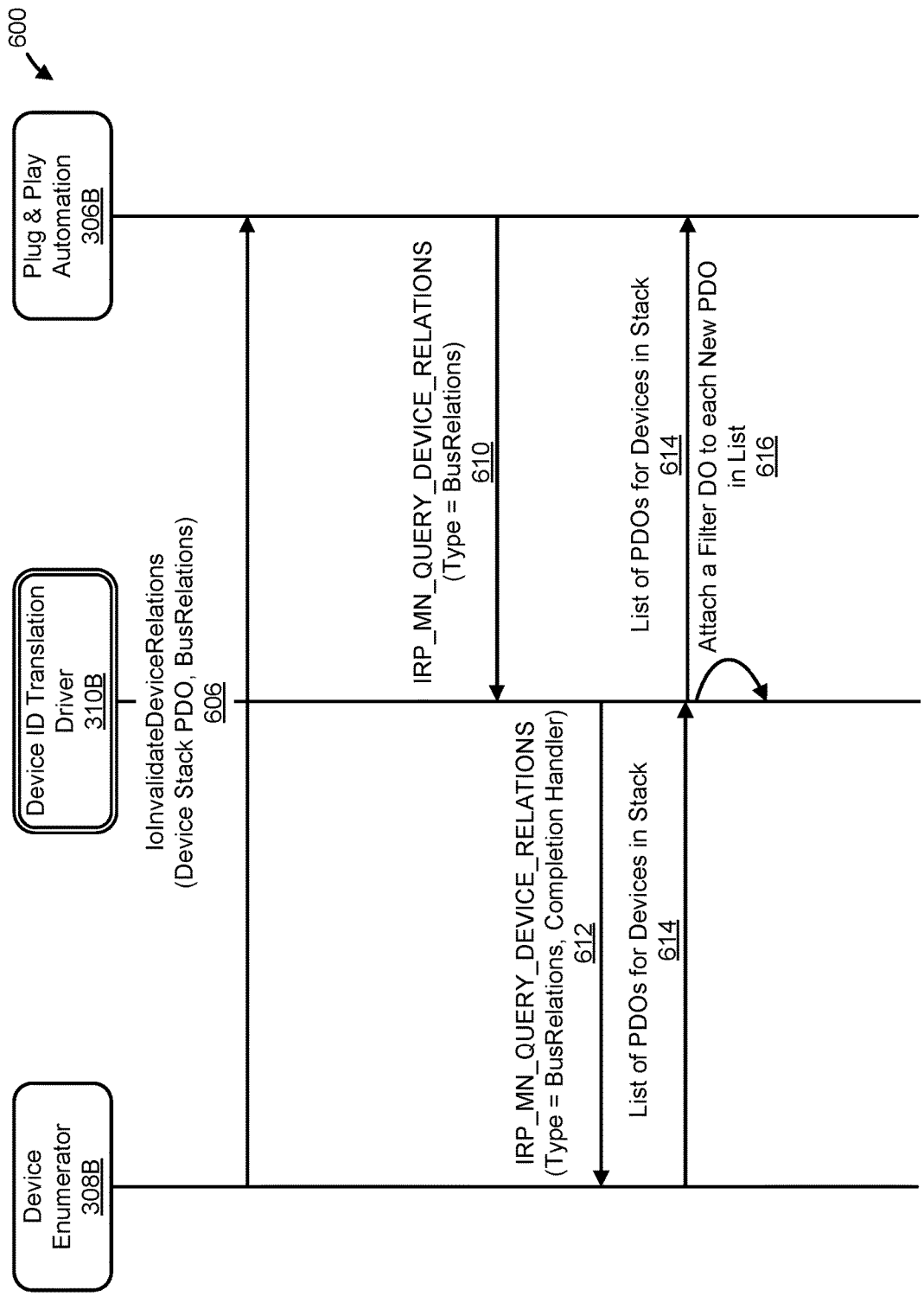
FIGS. 6A and 6B are sequence diagrams illustrating another identifier translation process in accordance with one or more examples described herein.
Figure 6B:
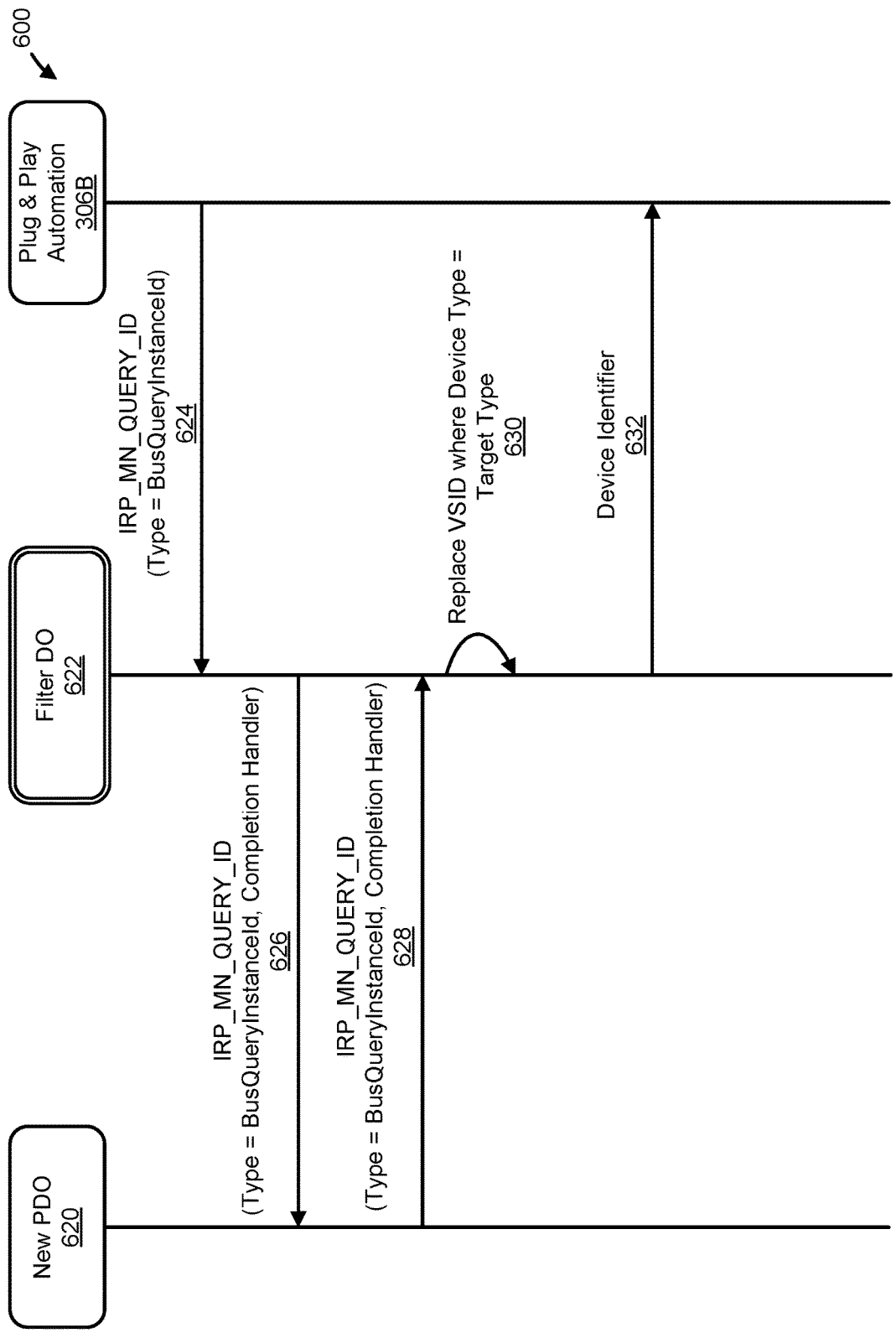

FIGS. 6A and 6B are sequence diagrams illustrating a device identifier translation process 600 executed by the example system described above. As shown in FIGS. 6A and 6B, the process 600 includes operations executed by the device enumerator 308B, the translation driver 310B, and the plug and play automation 306B of FIG. 3B. As shown in FIG. 6B, the process 600 also includes operations executed by new physical device objects (PDOs) 620 and filter driver objects (Filter DOs) 622. It should be noted that the Filter DOs 622 are a part of the translation driver 310B within the architecture presented in FIGS. 6A and 6B.

As shown in FIG. 6A, the process 600 starts with the device enumerator 308B (which is a VMBUS in this example) detecting the presence of a new device (which is a Hyper-V Gen 2 network device in this example) and calling an IoInvalidateDeviceRelations( ) function 606 exposed by an API supported by the plug and play automation 306B (which is the MICROSOFT WINDOWS PnP Manager in this example). The call to IoInvalidateDeviceRelations( ) includes a PDO for the device stack and a BusRelations type as arguments. This function call indicates to the plug and play automation 306B that there was a change in the device stack.

Continuing with the process 600, in response to reception of the IoInvalidateDeviceRelations( ) function call, the plug and play automation 306B transmits an IRP_MN_QUERY_DEVICE_RELATIONS request 610 having a type of BusRelations. In this example, the translation driver 310B is attached as an upper filter driver to the device enumerator 308B. As such, the translation driver 310B can process IRP_MJ_PNP requests of type IRP_MN_QUERY_DEVICE_RELATIONS. In this example, the translation driver 310B is configured to add a completion handler 612 to process the response from the device enumerator 308B where, as is the case in this example, the IRP_MN_QUERY_DEVICE_RELATIONS request has a type of BusRelations.

Continuing with the process 600, the device enumerator 308B processes the IRP_MN_QUERY_DEVICE_RELATIONS request and responds to the plug and play automation 306B with a list of PDOs 614 for devices in the device stack. The translation driver 310B processes this list to attach a filter DO 616 to each new PDO in the list. In this example, the PDOs include a new PDO 620 for the new device and the translation driver 310B attaches a filter DO 622 to the new PDO 620. By this arrangement, the filter DO 622 can process and modify requests transmitted to the new PDO 620.

Continuing with the process 600, with reference to FIG. 6B the plug and play automation 306B transmits an IRP_MN_QUERY_ID request 624 having a type of BusQueryInstanceId to the new PDO 620 to acquire device identifiers (e.g., device identification strings/GUIDs) for the new device. The filter DO 622 processes these requests and adds a completion handler 626 to process the response from the new PDO 620 to the IRP_MN_QUERY_ID request. The completion handler processes a response 628 to the IRP_MN_QUERY_ID request. Where, as is the case in this example, the IRP_MN_QUERY_ID request has a type of BusQueryInstanceId, the device type is a Hyper-V synthetic network device, and this is the first such device configured by the plug and play automation 306B, the completion handler replaces the device instance identifier or VSID 630 in the device identifier returned by the new PDO 620 with the reference identifier (which is a GUID in this example). This reference identifier is a copy of the reference identifier stored in the ENUM key holding the reference configuration data described above. The filter DO 622 next passes the modified device identifier 632 to the plug and play automation 306B by, for example, updating an I/O status block accessible by the plug and play automation 306B, and the process 600 ends.

Upon completion of the device identifier translation process 600, the plug and play automation 306B completes installation of the new device during kernel mode processing, thereby enabling other kernel mode processes to utilize the new device without requiring initiation of user mode processing.

Each of the processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and processes discussed herein.

Computing Devices for Device Identifier Translation Systems

Figure 7:
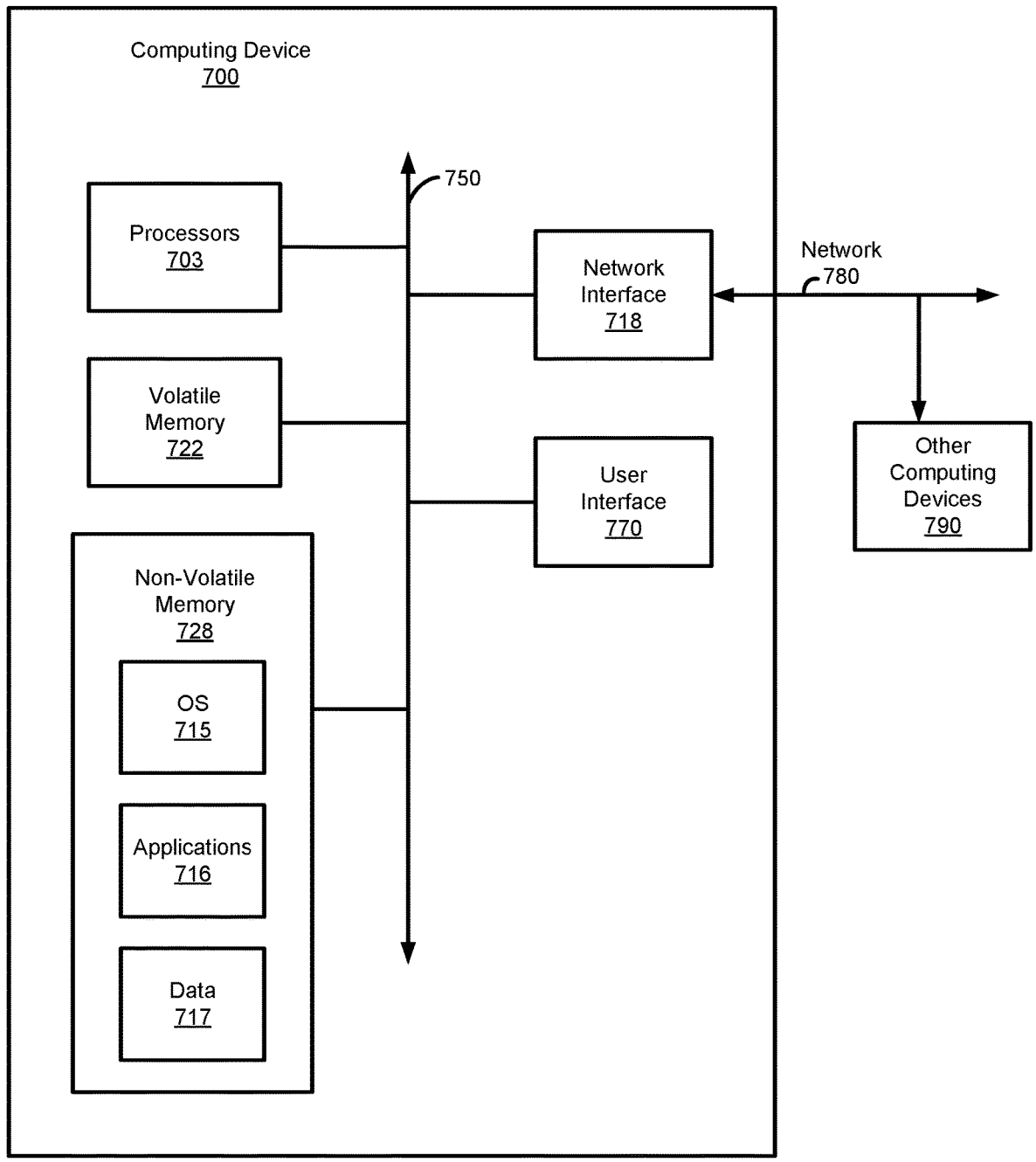
FIG. 7 is a block diagram of a network environment of computing devices in which one or more examples described herein can be implemented.

FIG. 7 is a block diagram of a computing device 700 configured to implement various device identifier translation systems and processes in accordance with examples disclosed herein.

The computing device 700 includes one or more processors 703, volatile memory 722 (e.g., random access memory (RAM)), non-volatile memory 728, a user interface (UI) 770, one or more network or communication interfaces 718, and a communications interconnect (e.g., a bus, fabric, etc.) 750. The computing device 700 may also be referred to as a client device, computing device, endpoint device, computer, or a computer system.

The non-volatile (non-transitory) memory 728 can include one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 770 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, one or more accelerometers, and/or one or more visors, etc.).

The non-volatile memory 728 stores an operating system 715, one or more applications or programs 716, and data 717. The operating system 715 and the application 716 include sequences of instructions that are encoded for execution by processors 703. Execution of these instructions results in manipulated data. Prior to their execution, the instructions can be copied to the volatile memory 722. In some examples, the volatile memory 722 can include one or more types of RAM and/or a cache memory that can offer a faster response time than a main memory. Data can be entered through the user interface 770 or received from the other input/output devices, such as the network interface 718. The various elements of the device 700 described above can communicate with one another via the communications bus 750.

The illustrated computing device 700 is shown merely as an example client device or server and can be implemented within any computing or processing environment with any type of physical or virtual machine or set of physical and virtual machines that can have suitable hardware and/or software capable of operating as described herein.

The processors 703 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processors 703 can be analog, digital, or mixed. In some examples, the processors 703 can be one or more locally-located physical processors or one or more remotely-located physical processors. The processors 703 can include multiple processor cores and/or multiple processors and can provide functionality for parallel, simultaneous execution of instructions or for parallel, simultaneous execution of one instruction on more than one piece of data.

The network interfaces 718 can include one or more interfaces to enable the computing device 700 to access a computer network 780 such as a Local Area Network (LAN), a Wide Area Network (WAN), a Personal Area Network (PAN), or the Internet through a variety of wired and/or wireless connections, including cellular connections and Bluetooth connections. In some examples, the network 780 may allow for communication with other computing devices 790, to enable distributed computing. The network 780 can include, for example, one or more private and/or public networks over which computing devices can exchange data.

In described examples, the computing device 700 can execute an application on behalf of a user of a client device. For example, the computing device 700 can execute one or more virtual machines managed by a hypervisor. Each virtual machine can provide an execution session within which applications execute on behalf of a user or a client device, such as a hosted desktop session. The computing device 700 can also execute a terminal services session to provide a hosted desktop environment. The computing device 700 can provide access to a remote computing environment including one or more applications, one or more desktop applications, and one or more desktop sessions in which one or more applications can execute.

Figure 8:
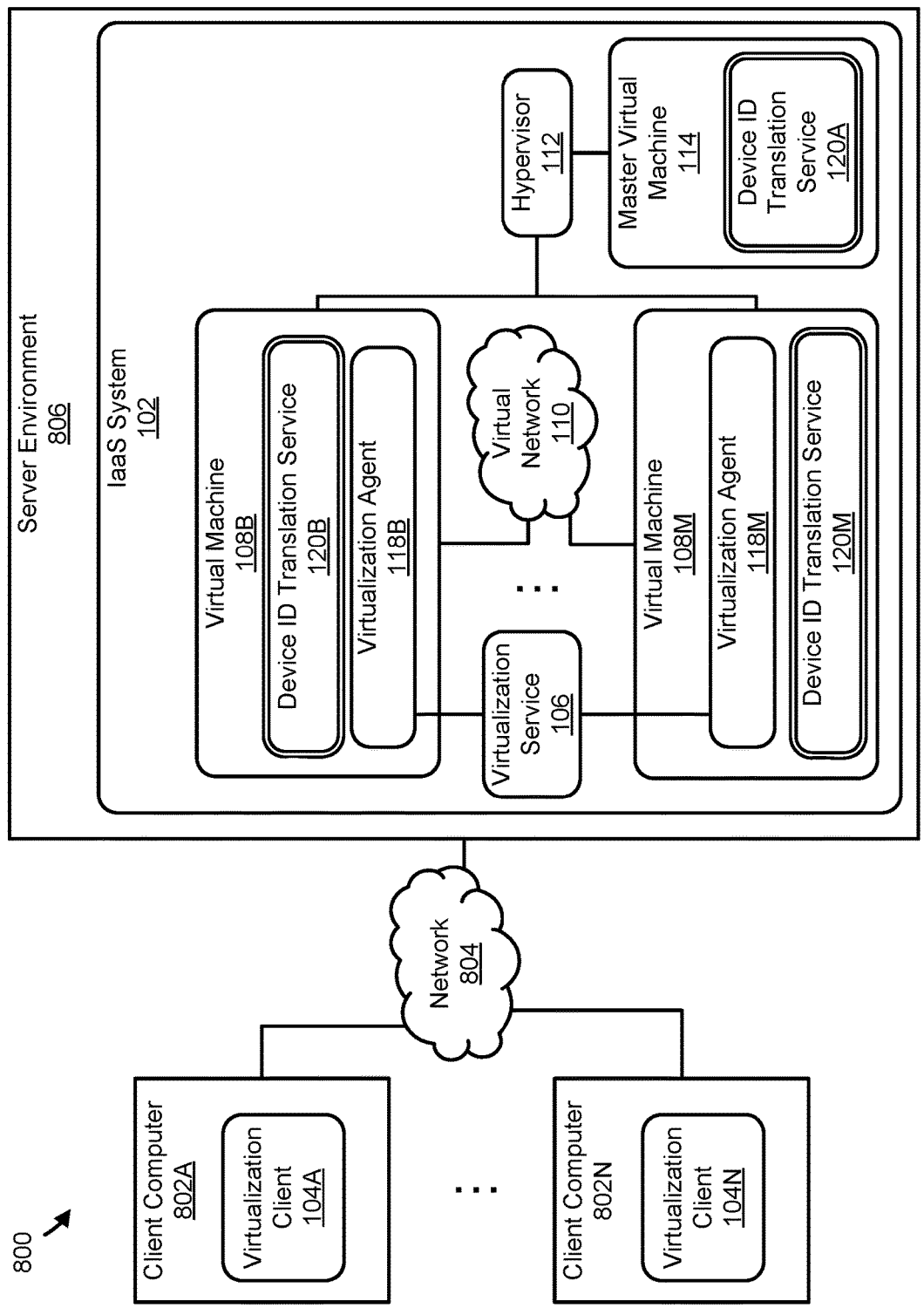
FIG. 8 is a block diagram of the system of FIG. 1 as implemented within a configuration of computing devices in accordance with one or more examples described herein.

FIG. 8 illustrates selected portions of a system with device identifier translation (e.g., the system 100 of FIG. 1) configured for operation within a distributed computing system 800 comprising computing devices (e.g. the computing device 700 of FIG. 7). As shown in FIG. 8, the distributed computing system 800 includes client computers 802A-802N, a network 804, and a server environment 806. The client computers 802A-802N and the server environment 806 are configured to interoperate with one another via the network 804. Each of the client computers 802A-802N, the network 804, and the server environment 806 includes at least one computing device (e.g., the computing device 700 of FIG. 7). In some examples, the server environment 806 includes a plurality of computing devices structured as a cluster or other high availability, high bandwidth computing platform.

As illustrated in FIG. 8, the client computers 802A-802N are configured to host the virtualization clients 104A-104N of FIG. 1. The server environment is configured to host the IaaS system 102 of FIG. 1, which includes the virtualization service 106, the virtual machines 108, the virtual network 110, the hypervisor 112, and the virtual machine master 114 of FIG. 1. The virtual machines 108 are configured to host the translation services 120 and the virtualization agents 118. The master virtual machine 114 is configured to host the translation service 120. Some of the components illustrated in FIG. 8 are described above with reference to FIG. 1. For purposes of brevity, those descriptions will not be repeated here, but each of these computer-implemented processes is configured to function with reference to FIG. 8 as described with reference to FIG. 1.

The distributed computing system 800 is but one example of many potential configurations that can be used to implement device identifier translation systems. As such, the examples disclosed herein are not limited to the particular configuration of computing devices and other configurations are considered to fall within the scope of this disclosure.

ADDITIONAL EXAMPLES

Example 1 is a computer system comprising a memory and at least one processor coupled to the memory and configured to identify a message to a plug and play (PnP) manager of an operating system, the message comprising an identifier of a device to be configured by the PnP manager, determine whether the device is targeted for device identifier translation at least in part by determining whether the device satisfies one or more target device criteria, and replace the identifier of the device with a reference identifier different from the identifier of the device in response to a determination that the device is targeted for device identifier translation, the reference identifier being usable by the PnP manager to install or configure the device.

Example 2 includes the subject matter of Example 1, wherein to replace the identifier of the device comprises to replace the identifier of the device during a boot process executable by the operating system.

Example 3 includes the subject matter of Example 2, wherein to replace the identifier of the device during the boot process comprises replacement of the identifier of the device during an initial boot process after connection of the device.

Example 4 includes the subject matter of either Example 2 or Example 3, wherein to replace the identifier of the device during the boot process comprises replacement of the identifier of the device during kernel mode processing.

Example 5 includes the subject matter of any of Examples 1 through 4, wherein the operating system is a guest operating system executed by a virtual machine.

Example 6 includes the subject matter of Example 5, wherein the virtual machine is one of a plurality of clones of a master virtual machine.

Example 7 includes the subject matter of any of Examples 1 through 6, wherein the reference identifier identifies reference configuration data to enable the PnP manager to complete installation of the device during kernel mode processing.

Example 8 includes the subject matter of Example 7, wherein the reference configuration data is based on device configuration data generated by installation of a reference device different from the device.

Example 9 includes the subject matter of Example 8, wherein the at least one processor is further configured to establish the reference identifier and the reference configuration data at least in part by accessing the device configuration data.

Example 10 includes the subject matter of any of Examples 1 through 9, wherein the target device criteria specifies a device to be accessed during a boot process executable by the operating system.

Example 11 includes the subject matter of Example 10, wherein the target device criteria specifies a network interface device type.

Example 12 is a method comprising acts of detecting a message to a plug and play (PnP) manager of a computer system, the message comprising an identifier of a device to be configured by the PnP manager; determining that the device is targeted for device identifier translation at least in part by determining that the device satisfies one or more target device criteria; and translating the identifier of the device to a reference identifier different from the identifier of the device in response to a determination that the device is targeted for device identifier translation, the reference identifier being usable by the PnP manager to install or configure the device.

Example 13 includes the subject matter of Example 12, wherein translating the identifier of the device comprises replacing the identifier of the device during kernel mode processing of an initial boot process executed by the computer system after connection of the device.

Example 14 includes the subject matter of either Example 12 or Example 13, further comprising streaming a clone of a master virtual machine, the clone comprising a guest operating system comprising the PnP manager.

Example 15 includes the subject matter of any of Examples 12 through 14, further comprising establishing the reference identifier from device configuration information generated by installation of a reference device different from the device.

Example 16 includes the subject matter of any of Examples 12 through 15, wherein determining that the device satisfies one or more target device criteria comprises determining that the device is to be accessed during a boot process executable by the operating system.

Example 17 is a non-transitory computer readable medium storing executable sequences of instructions to translate device identifiers, the sequences of instructions comprising instructions to: detect a message to a plug and play (PnP) manager of a computer system, the message comprising an identifier of a device to be configured by the PnP manager; determine whether the device is targeted for device identifier translation at least in part by determining whether the device satisfies one or more target device criteria; and replace, during kernel mode processing of an initial boot process executable by the computer system after connection of the device, the identifier of the device with a reference identifier different from the identifier of the device in response to a determination that the device is targeted for device identifier translation, the reference identifier being usable by the PnP manager to install or configure the device.

Example 18 includes the subject matter of Example 17, wherein the sequences of instructions further comprise instructions to stream a clone of a master virtual machine, the clone comprising a guest operating system comprising the PnP manager.

Example 19 includes the subject matter of either Example 17 or Example 18, wherein the sequences of instructions further comprise instructions to establish the reference identifier from device configuration information generated by installation of a reference device different from the device.

Example 20 includes the subject matter of any of Examples 17 through 19, wherein the instructions to determine whether the device is targeted for device identifier translation comprise instructions to determine whether the device is to be accessed during the initial boot process.

It should be noted that at least some examples described herein reside within a specific position within the driver stack of an operating system (e.g., between a device enumerator and PnP manager). This aspect of these examples is at least one feature that structurally distinguishes them from automation resident elsewhere within the operating system that translates other types of identifiers (e.g., internet protocol addresses, etc.).

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

Also, the phraseology and terminology used herein is for the purpose of description and should not be regarded as limiting. Any references to examples, components, elements, or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including", "comprising", "having", "containing", and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

The invention claimed is:

1. A computer system comprising:
   a memory; and
   at least one processor coupled to the memory and configured to
   identify a message to a plug and play (PnP) manager of an operating system, the message comprising an identifier of a device to be configured by the PnP manager,
   determine whether the device is targeted for device identifier translation at least in part by determining whether the device satisfies one or more target device criteria, and
   replace, during a boot process executable by the operating system, the identifier of the device with a reference identifier different from the identifier of the device in response to a determination that the device is targeted for device identifier translation, wherein the reference identifier identifies reference configuration data usable by the PnP manager to complete installation of the device during kernel mode processing of the boot process.

2. The computer system of claim 1, wherein to replace the identifier of the device during the boot process comprises replacement of the identifier of the device during an initial boot process after connection of the device.

3. The computer system of claim 1, wherein the reference configuration data is based on device configuration data generated by installation of a reference device different from the device.

4. The computer system of claim 3, wherein the at least one processor is further configured to establish the reference identifier and the reference configuration data at least in part by accessing the device configuration data.

5. The computer system of claim 1, wherein the target device criteria specify that the device is to be accessed during the boot process executable by the operating system.

6. The computer system of claim 5, wherein the target device criteria specify a network interface device type.

7. The computer system of claim 1, wherein the boot process is a boot process of a virtual machine.

8. The computer system of claim 7, wherein the operating system is a guest operating system executed by the virtual machine.

9. The computer system of claim 8, wherein the virtual machine is one of a plurality of clones of a master virtual machine.

10. A method comprising:
    detecting a message to a plug and play (PnP) manager of a computer system, the message comprising an identifier of a device to be installed by the PnP manager;
    determining that the device is targeted for device identifier translation at least in part by determining that the device satisfies one or more target device criteria; and
    translating, during a boot process executed by the computer system, the identifier of the device to a reference identifier different from the identifier of the device in response to a determination that the device is targeted for device identifier translation, the reference identifier identifying reference configuration data usable by the PnP manager to complete installation of the device during kernel mode processing of the boot process.

11. The method of claim 10, wherein translating the identifier of the device comprises replacing the identifier of the device during kernel mode processing of an initial boot process executed by the computer system after connection of the device.

12. The method of claim 10, further comprising streaming a clone of a master virtual machine, the clone comprising a guest operating system comprising the PnP manager.

13. The method of claim 10, further comprising establishing the reference identifier from device configuration information generated by installation of a reference device different from the device.

14. The method of claim 10, wherein determining that the device satisfies one or more target device criteria comprises determining that the device is to be accessed during the boot process executed by the computer system.

15. A non-transitory computer readable medium storing executable sequences of instructions to translate device identifiers, the sequences of instructions comprising instructions to:
    detect a message to a plug and play (PnP) manager of a computer system, the message comprising an identifier of a device to be configured by the PnP manager;
    determine whether the device is targeted for device identifier translation at least in part by determining whether the device satisfies one or more target device criteria; and
    replace, during kernel mode processing of an initial boot process executable by the computer system after connection of the device, the identifier of the device with a reference identifier different from the identifier of the device in response to a determination that the device is targeted for device identifier translation, the reference identifier being usable by the PnP manager to complete installation of the device during the kernel mode processing.

16. The non-transitory computer readable medium of claim 15, wherein the sequences of instructions further comprise instructions to stream a clone of a master virtual machine, the clone comprising a guest operating system comprising the PnP manager.

17. The non-transitory computer readable medium of claim 15, wherein the sequences of instructions further comprise instructions to establish the reference identifier from device configuration information generated by installation of a reference device different from the device.

18. The non-transitory computer readable medium of claim 15, wherein the instructions to determine whether the device is targeted for device identifier translation comprise instructions to determine whether the device is to be accessed during the initial boot process.

* * * * *